United States Patent [19]

Normen et al.

[11] Patent Number: 5,370,002

[45] Date of Patent: Dec. 6, 1994

[54] APPARATUS AND METHOD FOR REDUCING STRESS IN THE BRACE BAR OF A CORIOLIS EFFECT MASS FLOW METER

[75] Inventors: David F. Normen, Lafayette; Charles P. Stack, Louisville; Craig B. Van Cleve, Lyons, all of Colo.

[73] Assignee: Micro Motion, Inc., Boulder, Colo.

[21] Appl. No.: 97,191

[22] Filed: Jul. 23, 1993

[51] Int. Cl.5 .............................. G01F 1/84
[52] U.S. Cl. .............................. 73/861.37
[58] Field of Search .................... 73/161.37, 161.38

[56] References Cited

U.S. PATENT DOCUMENTS 4,781,069 11/1988 Mitzner ............... 73/861.38
4,823,613 4/1989 Cage et al. ........... 73/861.38

*Primary Examiner*—Herbert Goldstein
*Attorney, Agent, or Firm*—Duft, Graziano & Forest

[57] ABSTRACT

A Coriolis effect mass flow meter having a brace bar of improved flexibility which reduces the stress concentration in a brace bar as well as in areas of meter's flow tubes proximate the brace bar and flow tubes of the flow meter. A brace bar means is disclosed that has a void in an area between its holes that receive the flow tubes. This void increases the flexibility of the brace bar and shifts the concentration of operational and manufacturing induced stresses away from the braze joints between the brace bar and the flow tubes. The stresses are reduced and shifted away from the flow tubes to an area within the brace bar that is less critical to the overall life and reliability of the flow tubes. Meter sensitivity is improved due to enhanced flexibility of the present invention's brace bar in response to the motion induced by the Coriolis effect. Additional embodiments are disclosed which also provide increased flexibility of the brace bar while maintaining required rigidity to resist undesirable independent motion of the flow tubes.

25 Claims, 5 Drawing Sheets

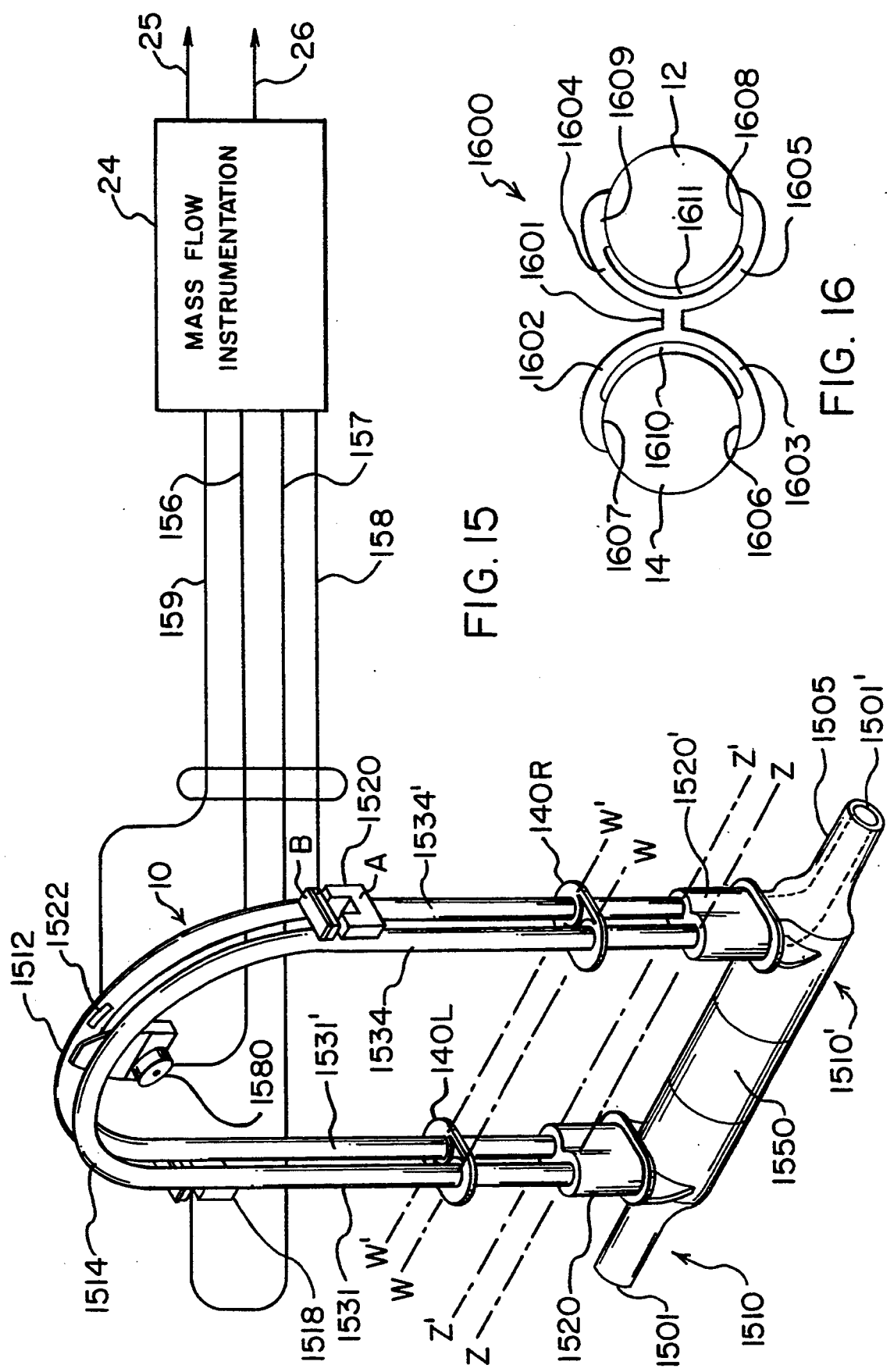

APPARATUS AND METHOD FOR REDUCING STRESS IN THE BRACE BAR OF A CORIOLIS EFFECT MASS FLOW METER

FIELD OF THE INVENTION

The present invention relates to a Coriolis effect mass flow meter. The invention further relates to a method and apparatus for reducing stress in flow tubes of the Coriolis effect meter. More specifically, the present invention relates to a Coriolis flow meter having brace bars which reduce stress the in flow tube areas adjacent the brace bars.

PROBLEM

It is known to use Coriolis effect mass flow meters to measure mass flow and other information for materials flowing through a conduit. As disclosed in the art, such as in U.S. Pat. Nos. 4,491,025 (to J. E. Smith, et al., of Jan. 1, 1985, and U.S. Pat No. Re. 31,450 to J. E. Smith of Feb. 11, 1982, these flow meters have one or more flow tubes of straight or curved configuration. Each flow tube configuration in a Coriolis mass flowmeter has a set of natural vibration modes, which may be of a simple bending, torsional or coupled type. Fluid flows into the flowmeter from the adjacent pipeline on the inlet side, is directed to the flow tube or tubes, and exits the flowmeter through the outlet side of the flowmeter. The natural vibration modes of the vibrating, fluid filled system are defined in part by the combined mass of the flow tubes and the fluid within the flow tubes. Each flow conduit is driven to oscillate at resonance in one of these natural modes.

When there is no flow through the flowmeter, all points along the flow tube oscillate with identical phase due to an applied driver force. As fluid begins to flow, Coriolis accelerations cause each point along the flow tube to have a different phase. The phase on the inlet side of the flow tube lags the driver, while the phase on the outlet side leads the driver. Sensors can be placed on the flow tube to produce sinusoidal signals representative of the motion of the flow tube. The phase difference between two sensor signals is proportional to the mass flow rate of fluid through the flow tube. A complicating factor in this measurement is that the density of typical process fluids varies. Changes in density cause the frequencies of the natural modes to vary. Since the flowmeter's control system maintains resonance, the oscillation frequency varies in response. Mass flow rate in this situation is proportional to the ratio of phase difference and oscillation frequency.

U.S. Pat. No. Re. 31,450 discloses a Coriolis flowmeter that avoided the need of measuring both phase difference and oscillation frequency. Phase difference is determined by measuring the time delay between level crossings of the two sinusoidal signals. When this method is used, the variations in the oscillation frequency cancel, and mass flow rate is proportional to the measured time delay. This measurement method is hereinafter referred to as a time delay measurement.

It is known to drive pairs of flow tubes of Coriolis meters so that they vibrate 180 degrees out of phase with respect to one another at a natural mode of vibration or at a harmonic of that natural frequency. These driven vibrations are termed "out-of-phase" vibrations. The pair of tubes in a Coriolis meter also has a natural mode of vibration in which the tubes move in phase with each other. These are called in-phase vibrations.

In-phase vibrations are of no use in Coriolis meters but can be excited under certain conditions such as by the vibration of the pipeline in which the meter is mounted, or by pressure pulsations in the fluid. If the Coriolis meter does not have a brace bar, the in-phase and out-of-phase vibrations will have essentially the same pivot points and hence nearly identical frequencies. The amplitudes of these in-phase vibrations are added to the out-of-phase vibrations. This combination of vibrations is undesirable since it can result in a beat frequency between the two modes, and it complicates the computation of mass flow by requiring compensation for the effects due to the in-phase vibration of the flow tubes. An additional problem is that, without a brace bar, both types of vibrations (in-phase and out-of-phase) cause the flow tubes to pivot about an axis through the weld joint that attaches the flow tubes to the manifold of the Coriolis meter. In time, the stresses caused by the sum of the in-phase and out-of-phase vibrations can weaken and eventually break the welded joints.

Brace bars are used on Coriolis meters to overcome these problems. Brace bars are typically affixed to the two flow tubes at a point between the driver location on the flow tubes and the welded joint that affixes the flow tubes to the manifold. A separate brace bar is affixed to the flow tubes at both the inlet and outlet sides of the tubes to fix the positions of the flow tubes with respect to one another. This bracing of the flow tubes solves the problems discussed above. The brace bar defines a new pivot axis for the out-of-phase vibrations of the flow tubes. This shifts the axis of out-of-phase vibrations away from the welded joint and raises the frequency of the out-of-phase driven vibrations from that of the in-phase vibrations. The desired frequency separation of the in-phase versus out-of-phase vibration is achieved by selecting an appropriate position for the brace bars. This simplifies a determination of mass flow since complexities resulting from the additive effects of the in-phase and out-of-phase vibrations of the flow tubes are no longer significant.

However, the use of brace bars creates high stresses in the portions of the flow tubes that are adjacent the braze joints that bond the flow tubes to the brace bar. These stresses can cause a premature failure of the brace bar or the flow tubes. These stresses, to some extent, are a result of the process used in affixing the flow tubes to the meter manifold. In the manufacture of particularly large flow meters, it is often desirable to braze the brace bars to the flow tubes before welding the flow tubes to the manifold. The flow tube ends are then welded one at time to the manifold. An end of a first flow tube is welded to the manifold, and then the corresponding end of the second of the flow tube is welded to the manifold. Each tube shrinks in length during the welding process. This shrinkage bends the brace bar and induces stress in the brace bar and the flow tube areas where the brace bar is brazed to the flow tubes. For example, the flow tubes are positioned as a pair with their ends abutting the portions of the manifold to which the flow tubes are to be attached. At this time, the brace bar is unstressed since the ends of the flow tubes evenly abut the manifold. However, during the welding of the first flow tube, it shrinks in length considerably, such as 1/32nd of an inch. This shrinkage bends the brace bar downward at one end and stresses the brace bar beyond its yield point so that the brace bar assumes a new, permanently bent, position. Next, when the second flow tube is welded, the second tube shrinks in length, bends the brace bar in the other direction and again stresses the brace bar beyond its yield point. This stressing of the brace bar beyond its yield points causes corresponding stress in the flow tubes to which the brace bar is attached. All of these residual stresses are added to the normal operating stresses subsequently described as the meter enters commercial use. As a result, the stressed elements may fail prematurely and shorten the life of the meter.

The driven out-of-phase vibrations also create stress in the flow tube areas proximate the brace bars. In normal operation the flow tubes act like end loaded cantilever beams in that their stresses are greatest at their fixed ends (the brace bar). In this locale, the stresses are greatest in the tube elements which are furthest from the tubes' neutral bending axes. This is the same location where the manufacturing residual stresses are at their greatest. These stresses are additive to any manufacturing induced stresses, as above described, so that the resulting total stress on the flow tubes is the sum of the manufacturing induced stress and stresses caused by the out-of-phase vibrations of the flow tubes. The magnitude of stresses in the elements of a Coriolis flow meter is related to the useful life of the meter. It is therefore important that all possible efforts be taken to reduce these stresses and, in particular, the stresses that are caused by the manufacturing processes used during the fabrication of the Coriolis flow meter.

SOLUTION

The present invention solves the above problems and achieves an advance in the art by providing a Coriolis meter brace bar that reduces the manufacturing and operational stresses in the flow tubes to which it is attached.

In order to explain the advantages of the present invention, it is necessary to establish a Cartesian coordinate system for each tube. The origins shall be at the intersections of each tube's centerline with the plane of the flat top surface of the brace bar. The Z axes shall be coincident with the flow tubes' longitudinal center line. The common X axis shall be on the plane of the top surface of the brace bar and intersect the Z axes of both flow tubes. The Y axes shall be on the plane of the surface of the brace bar and perpendicular to the Z and X axes.

The brace bar of the present invention has increased flexibility so as to permit the tubes increased relative translation in the Z axes and increased relative rotation about the Y axes.

Any brace bar must allow the meter's flow tubes to rotate independently with minimal constraint about the Y axis while rigidly constraining the flow tubes from translating independently in the X axis. This is axiomatic given the purpose of the brace bar. Increased independence of the Y axis rotation reduces stresses at the joints between the flow tubes and the brace bars due to out of phase driven vibration. Increased independence of the flow tubes to translate in the Z axis reduces the manufacturing induced stresses arising from thermal shrinkage due to the sequential welding of the flow tubes to the meter manifold. As the first tube to be welded shrinks during the welding process, the brace bar of the present invention is capable of flexing without yielding. Thus, when the second tube is welded and shrinks, the brace bar is returned to its undeformed state. This reduces the overall stress in the flow tubes, in the brace bars, and in the braze joints connecting the flow tubes to the brace bars by reducing or eliminating the residual stresses. The increased flexibility of the brace bars of the present invention decrease the stress level as well as shift the stresses into the brace bars and away from the joints between the flow tubes and the brace bars. All of this improves reliability of the joints, the brace bars, and lifetime of the flow tubes.

An additional benefit the brace bar of the present invention is that its increased flexibility enhances meter sensitivity to facilitate mass flow measurement at lower flow rates.

Various exemplary embodiments of a flexible brace bar of the present invention are disclosed. In one embodiment, a void is formed in the area of the brace bar between the flow tubes. A second embodiment removes only a portion of the material in this area of the bar leaving a "screen" of brace bar material. Another embodiment removes most, but not all of the brace bar material in the area between the flow tubes. In yet another embodiment, the brace bar is formed by joining of separate pieces. All the disclosed embodiments share the common advantage that the brace bar is more flexible in response to independent motion of the flow tubes in Z axis translation and to Y axis rotation.

BRIEF DESCRIPTION OF THE DRAWINGS

FIG. 15 shows another possible embodiment of a Coriolis effect meter utilizing the brace bars of the invention; and FIG. 16 shows another possible embodiment of a brace bar.

DETAILED DESCRIPTION

Figure 1:
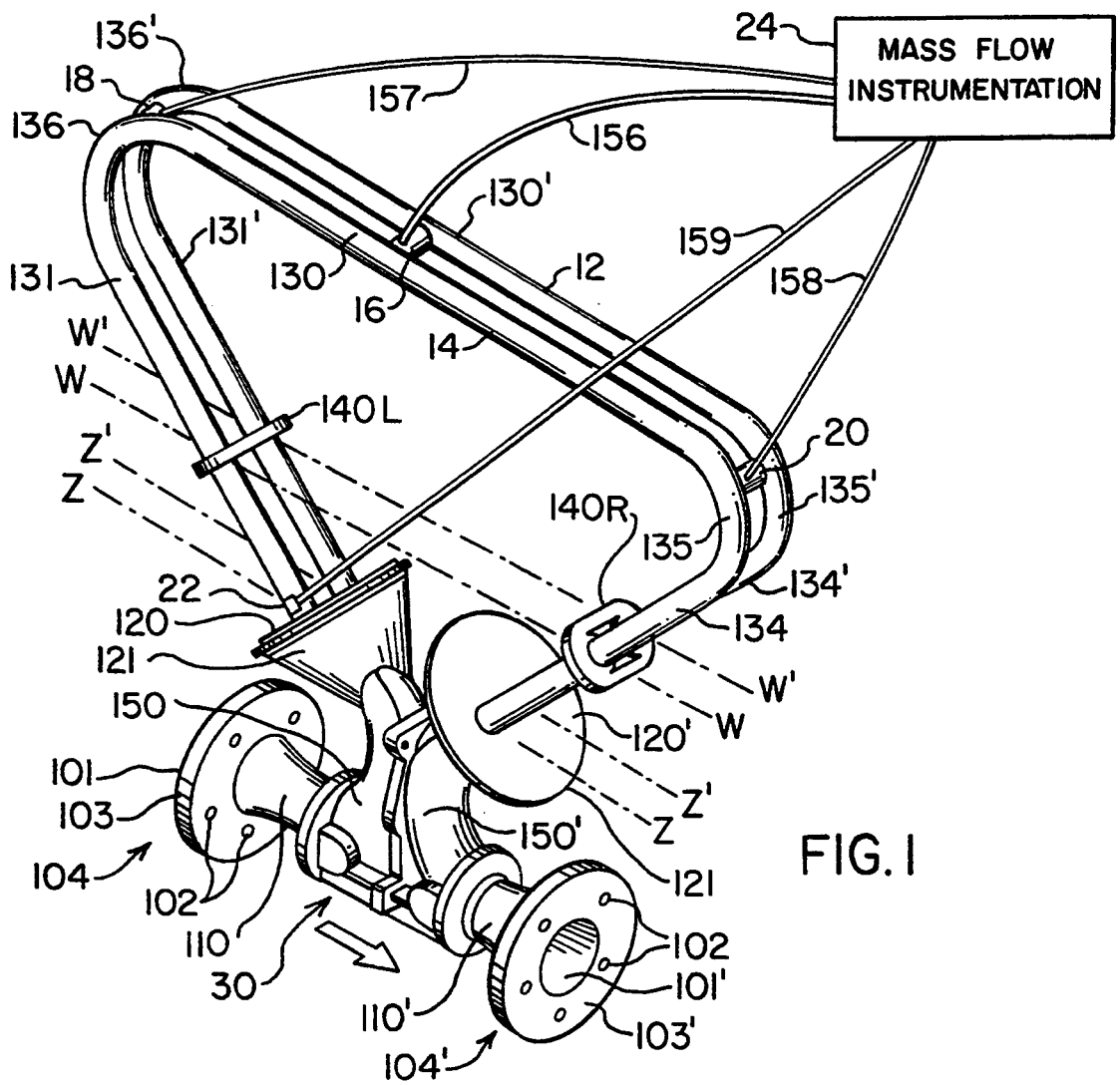
FIG. 1 shows an exemplary Coriolis effect meter utilizing the brace bars of the invention.

A typical Coriolis effect mass flow meter 10 is illustrated in FIG. 1 as having two cantilever mounted flow tubes 12, 14 mounted to a manifold body 30 so as to have substantially identical spring constants and moments of inertia about their respective out of phase bending axes W—W and W'—W'.

A drive coil and magnet 16 are mounted at a midpoint region between the top portion 130 and 130' of flow tubes 12, 14 to oscillate flow tubes 12, 14 out of phase about axes W—W and W'—W'. Left sensor 18 and right sensor 20 are mounted near the respective ends of the top portion 135, 136 and 135', 136 of flow tubes 12, 14 to sense the movement of flow tubes 12, 14. This sensing may be done either by measuring the movement of the ends 135, 136 and 135', 136 of the flow tubes 12, 14 through their zero crossings or by measuring the velocity of movement of the flow tubes. Flow tubes 12 and 14 have left side legs 131 and 131' and right side legs 134 and 134'. The side legs converge downwardly toward each other and are affixed to surfaces 120 and 120' of manifold elements 121 and 121'. Brace bars 140R and 140L are brazed to the legs of flow tubes 12, 14 and serve to define the axes W—W and W'—W' about which the flow tubes oscillate out of phase when driver 16 is energized over path 156. The position of axes W—W and W—W' is determined by the placement of brace bars 140R and 140L on flow tube side legs 131, 131' and 134, 134'.

Raising or lowering brace bars 140R and 140L along the legs alters the frequency difference between in-phase vibrations of the flow tubes 12, 14 about axes Z—Z and Z'—Z' caused by ambient conditions of the pipe to which the flow meter 10 is attached and the out-of-phase vibrations of flow tubes 12, 14 about axes W—W and W'—W'. The use of brace bars 140R and 140L also reduces the stress on the welds which join flow tube side legs 131, 131', 134, 134' to manifold surfaces 120 and 120' due to out-of-phase vibrations. This results from the fact that flow tubes 12, 14 vibrate out of phase about axes W—W and W'W' when a brace bar is used rather than about axes Z—Z and Z'Z'.

Temperature detector 22 is mounted on side leg 131 of flow tube 14 to measure the flow tube's temperature and the approximate temperature of the flowing fluid therein. This temperature information is used to determine changes in the spring constant of the flow tubes. Driver 16, sensors 18, 20 and temperature detector 22 are connected to mass flow instrumentation 24 by paths 156, 157, 158 and 159. Mass flow instrumentation 24 may include a microprocessor which processes the signals received from sensors 18, 20 and 22 to determine the mass flow rate of the material flowing through flow meter 10 as well as other measurements, such as material density and temperature. Mass flow instrumentation 24 also applies a drive signal over path 156 to driver 16 to oscillate tubes 12 and 14 out-of-phase about axes W—W and W'W'.

Manifold body 30 is formed of casting 150, 150'. Casting elements 150, 150' are attachable to a supply conduit and exit conduit (not shown), by flanges 103, 103'. Manifold body 30 diverts the material flow from the supply conduit into flow tubes 12, 14 and then back into an exit conduit. When manifold flanges 103 and 103' are connected via inlet end 104 and outlet end 104' to a conduit system (not shown), carrying the process material to be measured, the material enters manifold body 30 and manifold element 110 through an inlet orifice (not shown) in flange 103 and is connected by a channel (not shown) having a gradually changing cross-section in casting element 150 to flow tubes 12, 14. The material is divided and routed by manifold element 121 to the left legs 131 and 131' of flow tubes 14 and 12, respectively. The material then flows through the top tubes elements 130, 130' and through the right side legs 134 and 134' and is recombined into a single stream within flow tube manifold element 121'. The fluid is thereafter routed to a channel (not shown) in exit casting element 150' and then to exit manifold element 110'. Exit end 104' is connected by flange 103' having bolt holes 102' to the conduit system (not shown).

Figure 2:
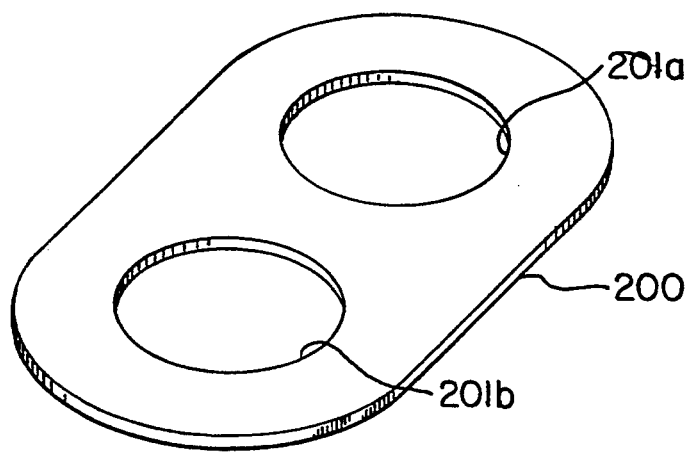
FIG. 2 shows a typical prior art brace bar.

FIG. 2 depicts a typical prior art brace bar 200 used with the meter of FIG. 1. Flow tubes 12, 14 of FIG. 1 are inserted through holes 201a and 201b of FIG. 2 and brace bar 200 is slid to the desired position on flow tubes 12, 14 to define the desired pivot axis W—W and W'—W' (FIGS. 1) for out-of-phase vibrations of flow tubes 12, 14. The flow tubes are then brazed to brace bar 200 and then their ends are welded to manifold surfaces 120, 120'.

Brace bar holes 201a and 201b provide rigid support for flow tubes 12, 14 of FIG. 1 to hold them spaced apart while providing for the limited twist and flex, of flow tubes 12, 14 that is needed for Coriolis flow measurements. Brace bar 200 is a pivot point that provides substantial resistance to the out-of-phase flexing of flow tubes 12, 14. This is due to the fact that the brace bar of FIG. 2 is a solid piece of metal between holes 201a and 201b. In practice, the brace bar shown in FIG. 2 may be ⅛ of an inch thick. It is desired in operation to have the flow tubes 12 and 14 flex with ease out of phase about the axes W—W and W'—W'. The prior art brace bar of FIG. 2 is formed of solid metal between the areas defined by the holes 201a and 201b and tends to resist any such flexing of the flow tubes. These out of phase vibrations of the flow tubes both generate stresses within the areas of the flow tubes adjacent to brace bar and in the brace bar itself.

Figure 3:
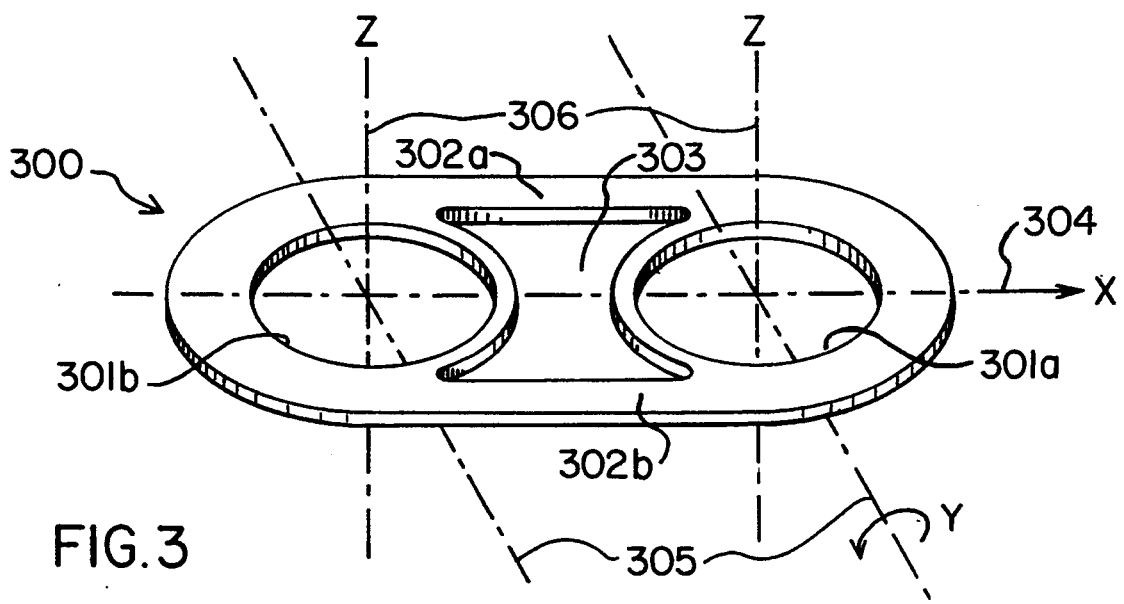
FIG. 3 shows one possible embodiment of a brace bar of the present invention with a void formed between the brace bar holes that receive the flow tubes.

FIG. 3 depicts a brace bar 300 designed in accord with the present invention. Brace bar 300 is representative of brace bars 140R and 140L of FIG. 1 and includes a void 303 and holes 301a and 301b for receiving flow tubes 12, 14. Void 303 increases the bending flexibility of brace bar 300 as compared to brace bar 200 in FIG. 2. Only small strips 302a, 302b of material on the sides of brace bar 300 need to be flexed by the out-of-phase vibration of flow tubes 12, 14 as opposed to the solid mass of material between flow tube holes 201a and 201b of brace bar 200 in FIG. 2. This enhanced flexibility reduces and shifts the stresses generated by the manufacturing process, as subsequently described, away from the braze joint of brace bar 300 and the flow tubes at flow tube holes 301a and 301b. It also reduces the flow tube stresses caused by the out of phase vibration of tubes 12, 14. Various shapes may be utilized to form void 303. Each shape shifts the stresses of manufacturing to different locations in brace bar 300. An easy flexing of the flow tubes about these axes contributes to an enhanced sensitivity for Coriolis motion detection purposes.

FIG. 3 depicts the three axes for which brace bar rigidity and flexibility are relevant: the Z axis 306 is perpendicular to the plane of brace bar 300 and coincident with the longitudinal axis of the side legs 131, 134 of flow tubes 12, 14, the X axis 304 is on the plane of the top flat surface of brace bar 300 and intersects both the center lines of flow tubes, and the Y axis 305 is on the plane the top flat surface of brace bar 300 and perpendicular to the X axis.

Figure 4:
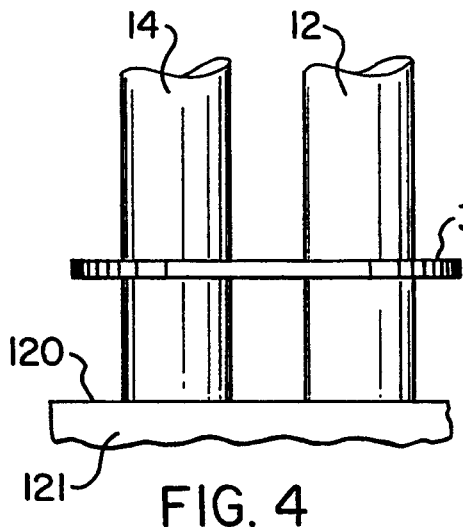
FIG. 4 shows a side on view of flow tubes and a brace bar in their nominal rest position.
Figure 5:
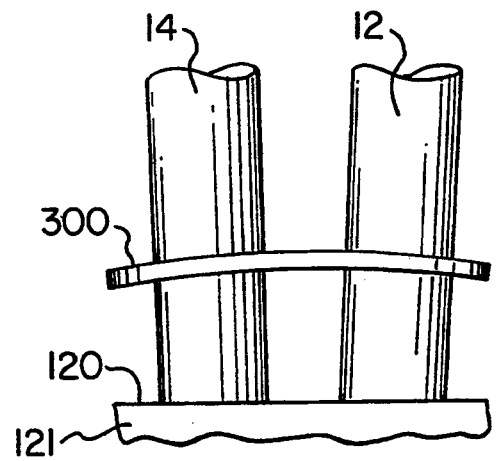
FIG. 5 shows a side on view of flow tubes and a brace bar flexed outward by the out of phase vibration of the flow tubes.
Figure 6:
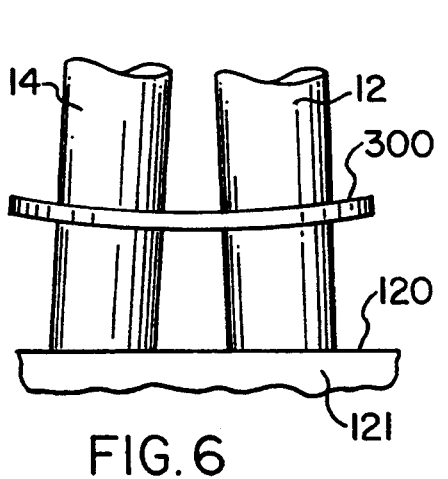
FIG. 6 shows a side on view of flow tubes and a brace bar flexed inward by the out of phase vibration phase of the flow tubes.

Brace bar 300 permits increased independence of translation of the flow tubes in the Z axis and increased independent rotation of the tubes in the Y axis as compared to brace bar 200 of FIG. 2. The increased independence of translation of the flow tubes in the Z-axis reduces the manufacturing induced stresses. Increased independence of the tubes' Y axis rotation reduces stresses in the joints between the flow tubes and the brace bars during normal out of phase vibration of the flow tubes. FIGS. 4–6 depict a brace bar 300 affixed by brazing to flow tubes 12, 14. The ends of flow tubes 12, 14 are, in turn, welded to surface 120 of manifold element 121. As driver 16 (FIG. 1) vibrates flow tubes 12, 14 out of phase, flow tubes 12, 14 alternately flex outwardly and inwardly from the pivot point (axis W—W [FIG. 1]) where brace bar 200 is affixed to flow tubes 12, 14. FIG. 4 depicts the flow tubes at the center point of such oscillations. FIG. 5 depicts the outward flex of tubes 12, 14 due to these out-of-phase vibrations. FIG. 6 depicts the inward flex of tubes 12, 14. In FIG. 5 it can be seen that brace bar 300 flexes upward at its center as flow tubes 12, 14 are driven outward. In FIG. 6, brace bar 300 flexes downward at its center in response to tubes 12, 14 being driven inward. It is relatively difficult to flex the prior art brace bar of FIG. 2 in the manner shown in FIGS. 5 and 6 since forces required must be applied to the brace bar by the flow tubes 12 and 14. These forces are relatively high for brace bar 200 and cause stress in the areas of the flow tubes adjacent the brace bar as well as in the brace bar itself.

Brace bar 300 has improved flexibility and bends more easily because of its void 303 and its thin side rails 302a and 302b. This improved flexibility reduces stress in both brace bar 300 and flow tubes 12, 14 in the area of their braze joint with brace bar 300. A brace bar such as 200 of FIG. 2, without the improved flexibility of the present invention, resists these out-of-phase oscillations more than does brace bar 300. This increases the stress in brace bar 200 and flow tubes 12, 14. Such increased stress can weaken and eventually destroy the brace bar, the flow tubes, or both.

Figure 7:
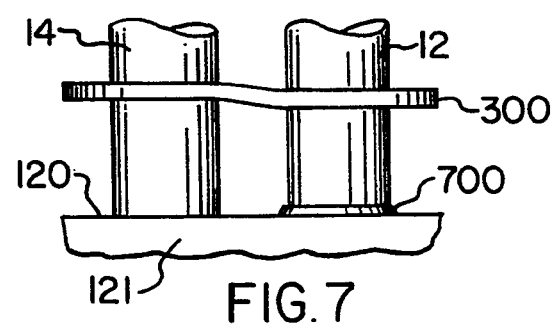
FIGS. 7 and 8 illustrate the stresses induced in the flow tubes and brace bar by the manufacturing process.
Figure 8:
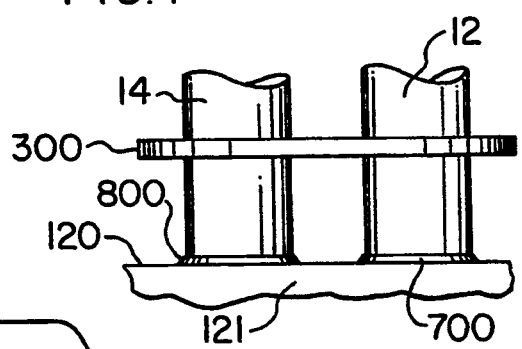

Increased independence of the flow tubes to translate in the Z-axis with the use of brace bar 300 reduces the manufacturing induced stresses arising from thermal warpage and shrinkage due to sequential welding process used to join the flow tubes to the manifold surfaces 120, 120'. FIGS. 4, 7 and 8 depict brace bar 300 affixed by brazing to flow tubes 12, 14. On large flow meters, flow tubes 12, 14 are welded sequentially at their ends to manifold surface 120 after they are brazed to a brace bar. Each flow tube shrinks slightly when it is welded to manifold element 120. In FIG. 4, flow tubes 12, 14 are brazed to brace bar 300 and their ends abut manifold surface 121, but are not yet welded. In FIG. 7, flow tube 12 is welded to manifold 121 at joint 700. The welding process causes flow tube 12 to shrink and bend brace bar 300 at its center downwardly to accommodate the shrinkage of flow tube 12. In FIG. 8, flow tube 14 is next welded to manifold surface 120 at joint 700. The welding process causes flow tube 14 to shrink slightly and bend brace bar 300 at its center back to a nearly nominal planar position. The rigid brace bar 200 of FIG. 2 resists the bending forces due to the shrinkage of flow tubes 12 and 14. Often, a brace bar 200 will resist bending to the point of yielding at its brazed joint to flow tubes 12, 14 when the first flow tube is welded. This creates undesirable residual stress. Once a first braze joint between brace bar 200 and flow tube 12 has yielded, the welding of the second flow tube 14 creates a second set of large stress at the braze joints of the brace bar 200 and flow tubes 12, 14 as the brace bar is sent back to a planar position of FIG. 8. Brace bar 300, because of its improved flexibility, does not yield after the first tube weld and is thus returned to a stress free condition by the sequential welding process.

Figure 9:
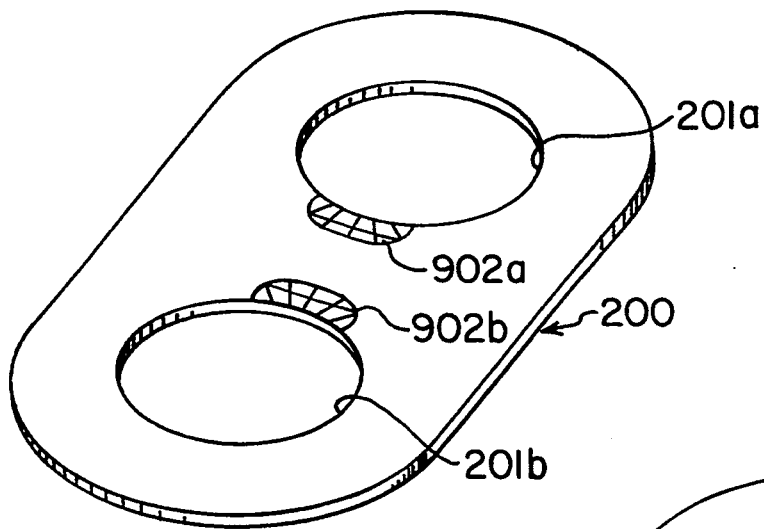
FIG. 9 shows a plot of the stress concentrations in the brace bar of FIG. 2.

FIG. 9 is a graphical representation of the stresses at various points on brace bar 200. The shaded areas 902a and 902b indicate areas of high stress created by both the out-of-phase vibrations and the manufacturing process described above. These high stress shaded areas 902a and 902b also occur at the braze joint between brace bar 200 and the flow tubes (not shown) inserted through flow tube holes 201a and 201b. These stresses can weaken and eventually destroy brace bar 200, the flow tubes 12, 14, or both.

Figure 10:
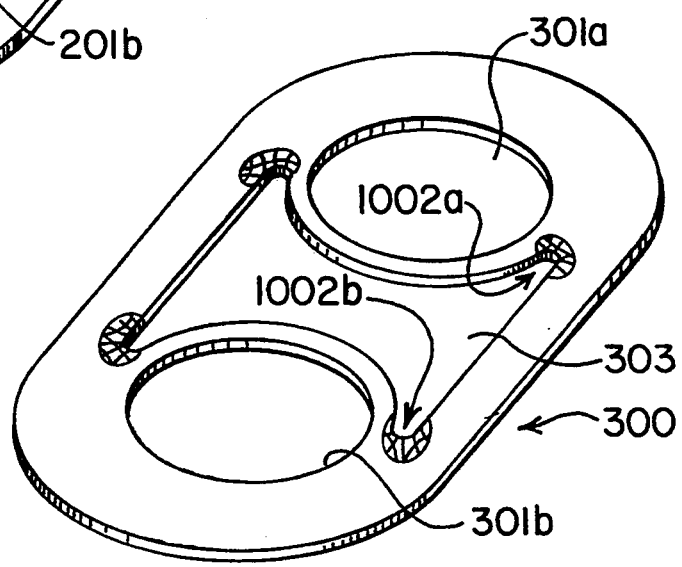
FIG. 10 shows a plot of the stress concentrations in the brace bar of FIG. 3.

FIG. 10 shows a graphical representation of the same manufacturing induced stresses in a brace bar 300 designed with a void 303 in accord with the present invention. The shaded areas 1002a and 1002b show that these manufacturing induced stress are moved away from the brace bar's 300 area where the flow tubes are inserted through flow tube holes 301a and 301b. These manufacturing stresses are one tenth the magnitude of the stresses induced in a brace bar without the void 200 of FIG. 9, and are no longer coincident with the stresses due to out-of-phase bending. Moving these manufacturing induced stress points 1002a and 1002b away from the braze joint between brace bar 300 and the flow tubes 12, 14 isolates the flow tubes 12, 14 from these manufacturing induced stresses, lowers all the stresses in the region, and improves the reliability of the flow tubes and the brace bar 300 itself.

Figure 11:
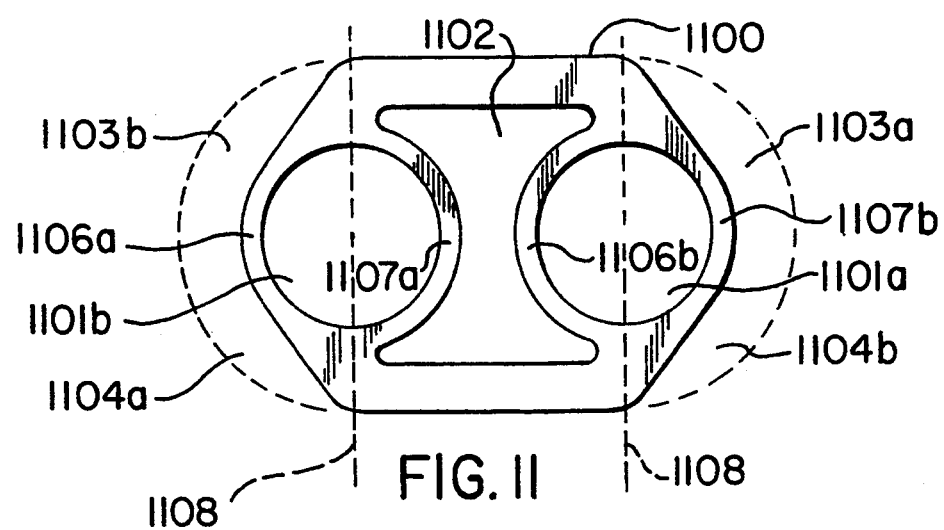
FIG. 11 shows a possible exemplary embodiment of the brace bar of FIG. 10 with a void formed in the bar between the flow tube holes.

FIG. 11 depicts brace bar 1100 comprising another possible exemplary embodiment of the invention. Flow tubes (not shown) are inserted through flow tube holes 1101a and 1101b. Void 1102 is formed in the area between these holes to increase the flexibility of brace bar 1100 by removing rigid mass that is resistant to flexing between flow tube holes 1101a and 1101b in a manner similar to that of void 303 in brace bar 300 of FIG. 3. Brace bar 1100 also has less material than does the brace bar of FIG. 3 in its outer areas 1104a and 1104b. The elimination of the material that would otherwise comprise areas 1104a and 1104b reduce the stresses on the outside of flow tubes inserted into holes 1101a and 1101b by transferring the brace bar forces to the tubes primarily near the flow tubes neutral bending axes. Elimination of the mass of material reduces the stiffness of the brace bar. This reduces stress in both the flow tubes and brace bars by reducing the impedance to out-of-phase bending.

Figure 12:
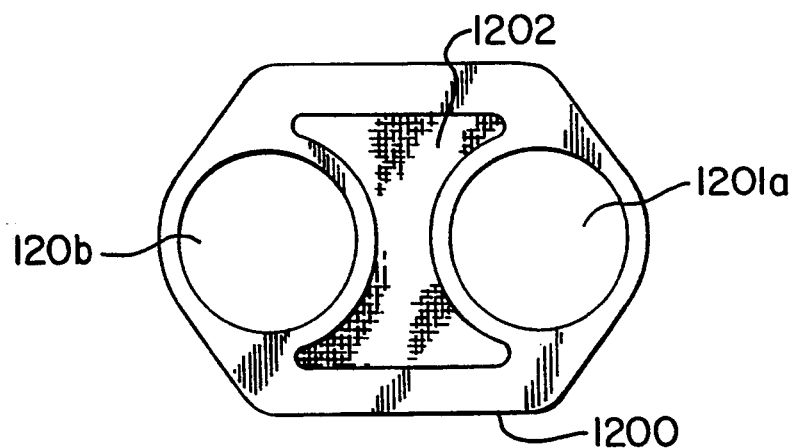
FIG. 12 shows a possible alternative embodiment of the brace bar of FIG. 11 with a screen formed in the area between the tubes.

FIG. 12 shows a brace bar 1200 comprising another possible exemplary embodiment of the present invention. Flow tubes (not shown) are inserted through flow tube holes 1201a and 1201b. Rather than a total void as depicted in FIG. 12, only a portion of the material is removed from brace bar 1200 of FIG. 12 between flow tube hole areas 1201a and 1201b. This leaves a porous screen area 1202 rather than the void of 1102 of FIG. 1. Screen area 1202 increases the flexibility of brace bar 1200 by removing some rigid mass that is resistant to flexing between flow tube hole 1201a and 1201b. This increases its flexibility of brace bar 1200 to bend in response to Z axis translation and Y axis rotation of the flow tubes.

Figure 13:
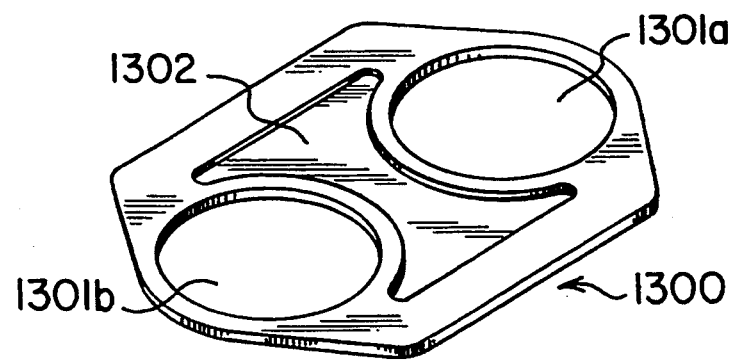
FIG. 13 is a perspective view of another possible alternative exemplary embodiment of the brace bar of FIG. 11.

FIG. 13 shows a brace bar 1300 comprising another possible exemplary embodiment of the present invention. Flow tubes (not shown) are inserted through flow tube holes 1301a and 1301b. Rather than a total void as depicted in FIG. 11, only a portion of the material is removed from brace bar 1300 between flow tube holes 1301a and 1301b leaving a thin continuous flexible area 1302. The thin area 1302 has a small amount of material that has a lowered resistance to bending and therefore increases the flexibility of brace bar 1400 due to the reduction in the material that must be flexed. This provides stress reductions in both the flow tubes and the brace bar for the same reasons already discussed in connection with the brace bars of FIGS. 11 and 12.

Figure 14:
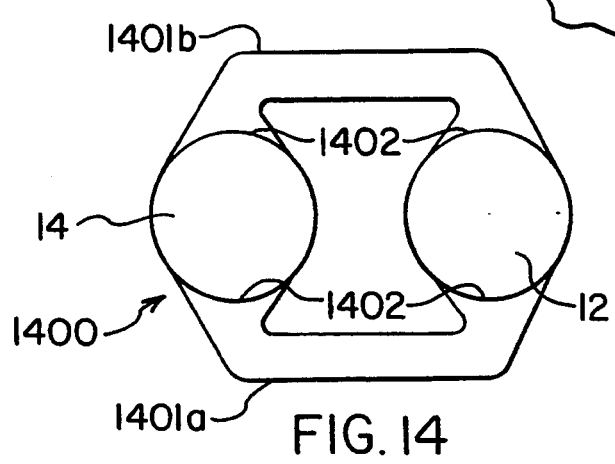
FIG. 14 shows another possible embodiment of a brace bar of FIG. 3 formed by two separate sections of material.

FIG. 14 shows brace bar 1400 as comprising another possible exemplary embodiment of the present invention. Brace bar 1400 is made of two separate sections 1401a and 1401b. Sections 1401a and 1401b are joined to flow tubes 12, 14 (viewed from above as a cross-section) at joints 1402. The two sections 1401a and 1401b are in substantially the same plane perpendicular to flow tubes 12, 14. This brace bar construction provides added flexibility to brace bar 1400 which enables it to bend in response to Z axis translation and Y axis rotation of the flow tubes 12, 14, while maintaining sufficient rigidity to constrain independent X axis translation of flow tubes 12, 14. The embodiment of FIG. 14 is advantageous in that it provides for the total elimination of the brace bar material that would otherwise be attached to the outboard sides of the flow tubes as viewed in FIG. 14. When comparing the brace bars of FIG. 11 and 14, it can be seen that the brace bar of FIG. 14 does not have the left side areas 1106a and 1106b of FIG. 11 nor does it have the right side areas 1107a and 1107b of the brace bar of FIG. 11. These left and right side areas 1106a and 1106b and 1107a and 1107b provide no useful function regarding the brace bar and its flexibility or with respect to stress reduction in either the brace bar or the flow tubes. Conversely, the provision of the brace bar of FIG. 14, which does not have elements corresponding to 1106a and 1106b and 1107a and 1107b, reduces impedance to motion of the material that is attached to the flow tube areas proximate the brace bar. The impedance reduction decreases the stress on the flow tube and thereby increases both the life of the flow tube and the life of the brace bar.

FIG. 16 shows another possible exemplary embodiment of the invention as comprising brace bar 1600 having a single rail section 1601 extending between flow tubes 14 and 12. Rail 1601 is connected on its left end to brace bar elements 1602 and 1603 and on its right end to elements 1604 and 1605. The upper left end element 1602 is connected by an arcuate portion 1607 to the upper portion of tube 14. The lower left element 1603 is connected by its arcuate portion 1606 to the bottom of flow tube 14. In a similar manner, the right end portions 1604 and 1605 are connected via their arcuate portions 1609 and 1608, respectively, to the upper and lower portions, respectively, of flow tube 12.

The construction of brace bar 1600 provides added flexibility which enables the brace bar to bend in response to Z axis translations and Y axis rotations of flow tubes 12 and 14 while maintaining sufficient rigidity to constrain independent X axis translations of flow tubes 12 and 14. The voids 1610 and 1611 between the outer surface of the flow tubes and the end portions of the brace bar move the stress concentration, due to manufacturing into stresses as well as out-of-phase vibrations, away from the portions of the brace bar and flow tubes where the movement and flexing of these elements is the greatest with respect to each other. The stresses in the embodiment of FIG. 16 are moved to the arcuate brazed joints bonding the flow tubes 12 and 14. These are the arcuate portions 1606 through 1609 of the end portions of the brace bar. The relative motions of the flow tubes and the brace bar with respect to each other are relatively small at these arcuate sections so that the induced stresses do not approach a level that can cause operational problems. The relatively narrow single rail section 1601 is sufficiently flexible to permit the Z axis translations associated with welding induced stresses during manufacture. The single rail section 1601 together with the end sections 1602 through 1605 are sufficiently flexible to accommodate the out-of-phase vibrations of the flow tubes.

FIG. 15 shows an alternative embodiment of a Coriolis effect meter utilizing the brace bars of the present invention. The meter 1210 of FIG. 15 is similar in many respects to the meter 10 of FIG. 1 and operates in the same manner utilizing the same principals to derive mass flow information in response to the concurrence of a driven out-of-phase vibration of flow tubes 1212 and 1214 together with a flow of the material whose characteristics are to be measured through flow tubes 1212 and 1214. The output information is supplied over conductors 158 and 157 to mass flow electronics 24. A temperature information signal applied to mass flow electronics 24 over path 159 and the mass flow electronics applies a drive signal over path 156 to driver 1280 which causes the two flow tubes to vibrate out of phase with respect to each other about the axes W—W and W'—W'.

Since the Coriolis effect meter 1210 of FIG. 15 is similar in most respects and in its principals of operation to the Coriolis effect meter 10 of FIG. 1, the following is primarily directed to the manner in which the Coriolis effect meter of FIG. 15 differs from that in FIG. 1.

The Coriolis meter assembly 1510 includes a pair of manifolds 1510 and 1510'; tubular member 1550; a pair of parallel flow tubes 1514 and 1512; driver 1580; a pair of sensors 1520 and 1518 each of which comprises a magnet B and coils A. Tubes 1512 and 1514 are substantially U-shaped and have their ends attached to mounting blocks 1520 and 1520' which in turn are secured to respective manifold 1510 and 1510'.

With the side legs 1531, 1531', 1534 and 1534' fixedly attached to the tube mounting blocks 1520 and 1520' and these blocks, in turn, fixedly attached to manifolds 1510 and 1510', a continuous close fluid path is provided through the Coriolis meter assembly 1510. The right side legs are designated 1534 and 1534' while the left side legs are designated 1531 and 1531'. The left and right side brace bars 140L and 140R correspond identically to those shown on FIG. 1 and serve the same purpose as the brace bars previously described in the preceding figures. Specifically, the brace bars shown on FIG. 15 have end portions attached to the two flow tubes and a middle portion intermediate the two end portions with the middle portion of the brace bar having substantially greater flexibility than the material comprising the end portion of the brace bars. The two flow tubes are driven to vibration in an out-of-phase manner by driver 1580. These vibrations cause the tubes to pivot about the axes W—W and W'—W' extending through the brace bars 140L and 140R. The flow tube assembly also vibrates in an in-phase mode about the axes Z—Z and Z'—Z' in the same manner as previously described in connection with the meter assembly of FIG. 1.

When meter 1510 is connected via inlet end 1501 and outlet end 1501', into a conduit system (not shown) which carries the fluid whose characteristics are to be measured, fluid enters the meter through an orifice end 1501 of manifold 1510 and is connected through a passageway therein having a gradually changing cross-section to mounting block 1520. There, the fluid is diverted and routed into the two flow tubes 1512 and 1514. Upon exiting the flow tubes 1512 and 1514 the fluid is recombined in a single stream within mounting block 1520' and is thereafter routed to manifold 1510'. Within manifold 1510' the fluid flows through a passageway having a similar gradually changing cross-section to that of manifold 1510—as shown by dotted lines 1505—to an orifice in outlet end 1501'. At end 1501', the fluid reenters the conduit system. Tubular member 1550 does not conduct any fluid. Instead, this member serves to axially align manifolds 1510 and 1510' and maintain the spacing therebetween by a predetermined amount so that these manifolds will readily receive mounting blocks 1520 and 1520' and flow tubes 1512 and 1514.

The meter assembly of FIG. 15 is similar in all other respects to the meter assembly of FIG. 1 and operates in the same manner as previously described for the meter assembly of FIG. 1 to generate mass flow and other information, as desired, for the material.

The specific meter structure shown in FIG. 15, devoid of the brace bar 140R and 140L of the present invention, is shown in detail in the U.S. Pat. No. 4,843,890 of Jul. 4, 1989, to Allen L. Sampson and Michael J. Zolock. Reference is hereby made to that patent for further detailed information regarding the meter structure of FIG. 15. The disclosure of the Sampson-Zolock patent is hereby incorporated by reference into the present specification to the same extend as if fully set forth herein.

It is expressly understood that the claimed invention is not to be limited to the description of the preferred embodiment but encompasses other modifications and alterations within the scope and spirit of the inventive concept.

We claim:

1. In a Coriolis effect flow meter:
    a pair of flow tubes having open ends attached to a manifold;
    brace bar means having flat planar surfaces perpendicular to the longitudinal axis of each of said flow tubes and further having edge surfaces perpendicular to said planar surfaces;
    a first end portion of said brace bar means having a first one of said edge surfaces attached to an exterior circumferential surface of a first one of said flow tubes; and
    a second end portion of said brace bar means having a second one of said edge surfaces attached to an exterior circumferential surface of a second one of said flow tubes; and
    drive means for vibrating said flow tubes out of phase with respect to each other about axes perpendicular to said flow tubes and extending through said brace bar means in a plane parallel to said planar surfaces;
    said brace bar means being spaced apart from said manifold and providing a pivot point for out-of-phase vibrations of said flow tubes;
    a center portion of said brace bar means intermediate said first end portion and said second end portion with said center portion having a length greater than the distance between said first flow tube and said second flow tube;
    said center portion further having greater flexibility than said first and second end portions for providing stress reduction in the potion of said flow tubes proximate said brace bar means.

2. The Coriolis effect flow meter of claim 1 wherein said center portion of said brace bar means includes a void.

3. The Coriolis effect flow meter of claim 1 wherein said center portion of said brace bar means includes an area defined by a screen.

4. The Coriolis effect flow meter of claim 1 wherein said center portion of said brace bar means includes an area having a thickness substantially less than the thickness of said first and second end portions.

5. The Coriolis effect flow meter of claim 1 wherein said center portion of said brace bar means comprises at least one elongated member interconnecting said first flow tube and said second flow tube.

6. The Coriolis effect flow meter of claim 1 wherein said center portion of said brace bar means includes a pair of side rails extending between said first and second end portions;
    each of said end portions comprising an annular ring comprising a plurality of quadrants;
    a first and a second one of said quadrants being connected to one of said flow tubes by said edge surfaces and further being connected to an end of one of said rails;
    a third and a fourth one of said quadrants being connected to only said flow tube by said edge surfaces.

7. The Coriolis effect flow meter of claim 1 wherein: said flow tubes are substantially U-shaped.

8. The Coriolis effect flow meter of claim 1 wherein each of said end portions of said brace bar means comprises a ring of material that encircles said flow tubes with said center portion of said brace bar means comprising a void.

9. The Coriolis effect flow meter of claim 1 wherein each of said end portions of said brace bar means comprises a ring of material that encircles said flow tubes with said center portion of said brace bar means comprising a screen material.

10. The Coriolis effect flow meter of claim 1 wherein each of said end portions of said brace bar means comprises a ring of material that encircles said flow tubes with said center portion of said brace bar means being of material substantially thinner than the material comprising said end portions.

11. The Coriolis effect flow meter of claim 1 wherein each of said end portions of said brace bar means comprises a ring of material comprising a plurality of quadrants that encircle a different one of said flow tubes with the material comprising a first and a second quadrant being substantially narrower than the material comprising a third and a fourth quadrant.

12. The Coriolis effect flow meter of claim 1 wherein said brace bar means comprises a top rail and a bottom rail each of which extends between said first portion and said second portion;
    semi-circular end portions on each of said rails;
    said semi-circular end portions each defining approximately a quadrant of the circumference of one of said flow tubes and being affixed by said edge surfaces to said flow tubes so as to leave approximately one half of said circumferential surfaces of each of said flow tubes free from attachment to said edge surfaces of said end portions.

13. In a Coriolis effect flow meter;
a pair of flow tubes having ends attached to a manifold:
a brace bar means having flat planar surfaces perpendicular to the longitudinal axis of each of said flow tubes and further having edge surfaces perpendicular to said planar surfaces;
said brace bar means being spaced apart from said manifold for providing a pivot point for out-of-phase vibrations of said flow tubes about an axis parallel to said planar surfaces;
a first end portion of said brace bar means attached by one of said edge surfaces to a first one of said flow tubes;
a second end portion of said brace bar means attached by a second one of said edge surfaces to a second one of said flow tubes; and
a center portion of said brace bar means intermediate said first end portion and said second end portion with said center portion having substantially greater flexibility than said first and second end portions; said center portion being effective for reducing the stress concentration in portions of said flow tubes proximate said brace bar;
said center portion having a length greater than the distance between said first flow tube and said second flow tube.

14. The Coriolis effect flow meter of claim 13 wherein said center portion of said brace bar means includes a void.

15. The Coriolis effect flow meter of claim 13 wherein said center portion of said brace bar means includes an area defined by a screen.

16. The Coriolis effect flow meter of claim 13 wherein said center portion of said brace bar means includes an area having a thickness substantially less than the thickness of said first and second end portions.

17. The Coriolis effect flow meter of claim 13 wherein said center portion of said brace bar means includes a pair of side rails extending between said first and second ends portions;
each of said end portions comprising an annular ring having a plurality of quadrants;
a first and second one of said quadrants being connected by said edges surfaces to one of said flow tube and to an end of one of said rails;
a third and a fourth one of said quadrants being connected by said edges surfaces to only said flow tube.

18. The Coriolis effect flow meter of claim 13 wherein each of said end portions of said brace bar means comprises a ring of material that attachably encircles said flow tubes with said center portion of said brace bar means comprising a void.

19. The Coriolis effect flow meter of claim 13 wherein each of said end portions of said brace bar means comprises a ring of material that attachably encircles said flow tubes with said center portion of said brace bar means comprising screen material.

20. The Coriolis effect flow meter of claim 13 wherein each of said end portions of said brace bar means comprises a ring of material that attachably encircles said flow tubes with said center portion of said brace bar means being substantially thinner than the material comprising said end portions.

21. The Coriolis effect flow meter of claim 13 wherein each of said end portions of said brace bar means comprises a ring of material having quadrants that attachably encircle said flow tubes with the material comprising a first and a second quadrant being substantially narrower than the material comprising third and fourth quadrants.

22. The Coriolis effect flow meter of claim 13 wherein said brace bar means comprises a top rail and a bottom rail each of which extends between said flow tubes;
said end portions comprising semi-circular end portions on each of said rails;
said semi-circular end portions each defining approximately a quadrant of the circumference of one of said flow tubes and being affixed by said edge surfaces to said flow tubes so as to leave approximately one-half of said circumferential surface each of said flow tubes free from attachment to said edges surfaces of said end portions.

23. The Coriolis effect flow meter of claim 13 wherein said center portion of said brace bar means comprises at least one elongated member interconnecting said first flow tube and said second flow tube.

24. The Coriolis effect flow meter of claim 13 wherein:
said center portion of said brace bar means comprises a single rail member connected at its ends to said first and second end portions of said brace bar; and
wherein:
said first and second end portions of said brace bar each comprises;
an upper end portion and a lower end portion each connected to an end of said rail member;
an arcuate terminus on each of said end portions adapted for attachment to a mating arcuate outer surface of said flow tubes; and
a space between said flow tubes and said upper and lower end portion intermediate said arcuate terminus and the juncture of said end portions with said rail member.

25. In a Coriolis effect flow meter:
a pair of flow tubes having ends attached to manifold means;
brace bar means having flat planar surfaces perpendicular to the longitudinal axis of each of said flow tubes and edges surfaces perpendicular to said planar surfaces;
a first end portion of said brace bar means having a first hole for attachably receiving a first one of said flow tubes at a position spaced apart from said manifold means;
a second end portion of said brace bar means having a second opening for attachably receiving a second one of said flow tubes at said position spaced apart from said manifold means; and
drive means for vibrating said flow tubes out of phase with respect to each other about axes perpendicular to said flow tubes and extending a surface parallel to said planar surfaces of said brace bar means;
said brace bar means being a picot point for said out-of-phase vibrations of said flow tubes;
a center portion of said brace bar means intermediate said first end portion and said second end portion with said center portion having greater flexibility than said first and second end portions for reducing operational stresses on said brace bar means and on said flow tubes as said flow tubes are vibrated as well as for reducing stresses applied to said brace bar means and said flow tubes when said ends of said flow tubes are affixed sequentially, one at a time, to said manifold means during the manufacture of said meter;

said center portion of said brace bar means having a length greater than the distance between said first flow tube and said second flow tube.

* * * * *